United States Patent [19]
Gauthier et al.

[11] Patent Number: 5,254,154
[45] Date of Patent: Oct. 19, 1993

[54] PROCESS FOR THE PURIFICATION OF A GAS BY ADSORPTION

[75] Inventors: Pierre Gauthier, Fresnes; Christian Monereau, Paris, both of France

[73] Assignee: L'Air Liquide, Societe Anonyme pour l'Etude et l'Exploitation des Procedes Georges Claude, Paris, France

[21] Appl. No.: 962,683

[22] Filed: Oct. 19, 1992

[30] Foreign Application Priority Data

Oct. 17, 1991 [FR] France ............... 91 12805

[51] Int. Cl.$^5$ ............................................. B01D 53/04
[52] U.S. Cl. .......................................... 95/12; 95/100; 95/116
[58] Field of Search .............. 55/25, 26, 58, 62, 68, 55/74, 75

[56] References Cited

U.S. PATENT DOCUMENTS

| | | | |
|---|---|---|---|
| 4,705,541 | 11/1987 | Sircar | 55/26 |
| 4,726,816 | 2/1988 | Fuderer | 55/26 |
| 4,810,265 | 3/1989 | Lagree et al. | 55/26 |
| 4,861,351 | 8/1989 | Nicholas et al. | 55/58 X |
| 4,869,894 | 9/1989 | Wang et al. | 55/58 X |
| 4,913,709 | 4/1990 | Kumar | 55/26 |
| 4,914,218 | 4/1990 | Kumar et al. | 55/26 |
| 4,915,711 | 4/1990 | Kumar | 55/58 X |
| 4,969,935 | 11/1990 | Hay | 55/68 X |
| 4,981,499 | 1/1991 | Hay et al. | 55/68 X |
| 5,026,406 | 6/1991 | Kumar | 55/26 |

FOREIGN PATENT DOCUMENTS 0398339  11/1990  European Pat. Off. .

*Primary Examiner*—Robert Spitzer
*Attorney, Agent, or Firm*—Young & Thompson

[57] ABSTRACT

Process for the purification of a gas containing selectively adsorbable impurities, of the type using several adsorbers with, for each adsorber, a cycle comprising the following operating phases which are offset from one adsorber to the next timewise by a fraction 1/n of the duration of the cycle in which n is the number of adsorbers, the cycle comprising substantially isobaric production at a high pressure of the cycle, this production comprising the admission of impure gas to be treated into an adsorber at a first end of the adsorber with circulation of this gas in the adsorber and simultaneous withdrawal from a second end of the adsorber of purified gas, the direction of flow in the adsorber from the first end to the second end being cocurrent and the opposite direction being countercurrent; regeneration of the adsorber comprising a decompression of the adsorber to a low pressure of the cycle, this decompression comprising at least one stage in which a residual gas is withdrawn countercurrent from the adsorber; and increasing the pressure to the high pressure of the cycle. A portion of the residual gas is mixed with the impure gas to be treated, and the rest of the residual gas is purged.

7 Claims, 2 Drawing Sheets

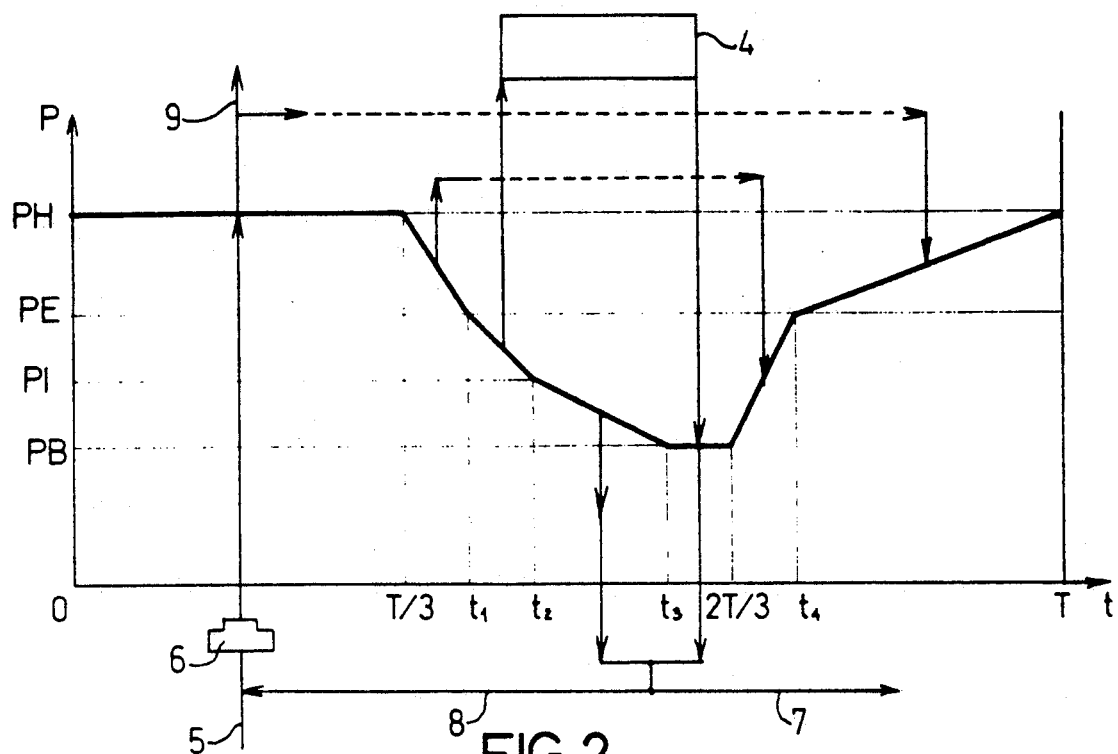
FIG·2
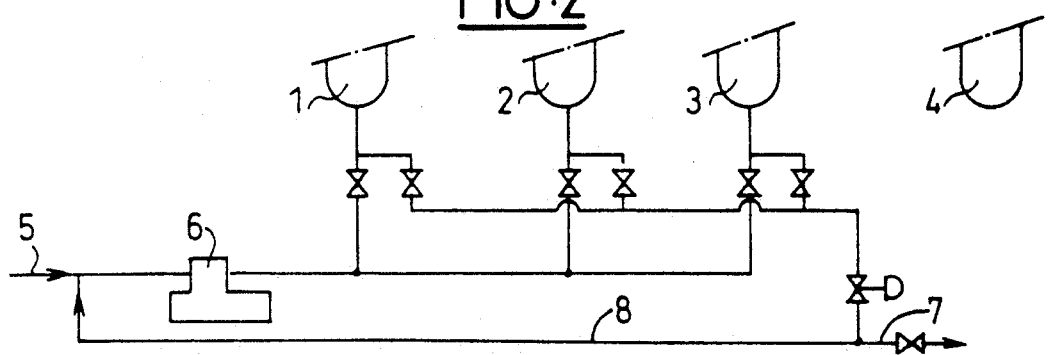
FIG·3
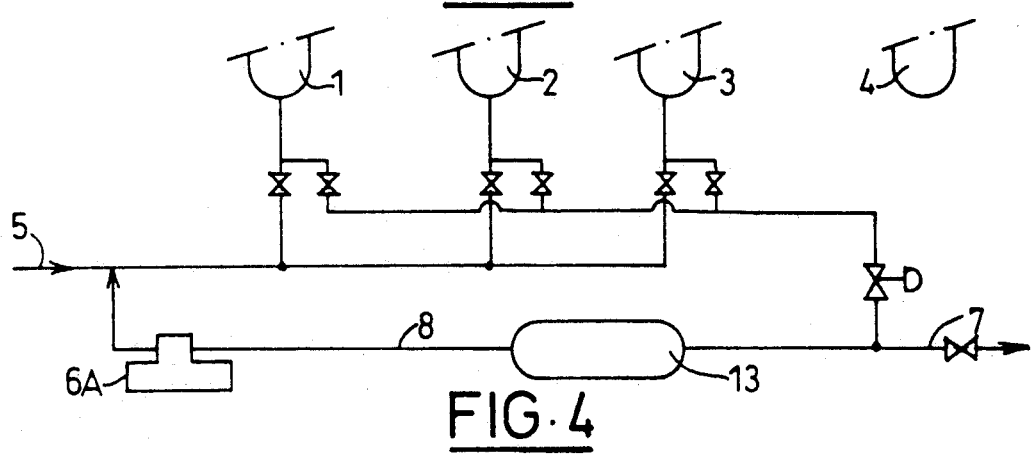
FIG·4

PROCESS FOR THE PURIFICATION OF A GAS BY ADSORPTION

The present invention relates to the purification by adsorption at variable pressure (Pressure Swing Adsorption or PSA) of a gas containing selectively adsorbable impurities, particularly hydrogen, and more particularly a process of the type using several adsorbers with, for each adsorber, a cycle comprising the following operating phases, which are timewise offset from one adsorber to another by a fraction 1/n of the duration of the cycle, where n designates the number of adsorbers: substantially isobaric production at a high pressure of the cycle, this production phase comprising the admission of the impure gas to be treated into the adsorber at a first or so-called entry end, of the adsorber, with circulation of this gas in the adsorber and simultaneous withdrawal from the other end of the adsorber of the purified gas, the direction of circulation in the adsorber in the course of this production phase being called cocurrent and the opposite direction of circulation being called countercurrent; regeneration of the adsorber comprising a decompression of the adsorber to a low pressure of the cycle, this decompression comprising at least one stage in which a residual gas is withdrawn countercurrent from the adsorber; and an increase in pressure to the high pressure of the cycle.

The invention has for its object to permit increasing the output of purified gas in such a process, particularly when the impure gas at the outset is already highly concentrated, that is, in the case of hydrogen, contains typically at least 90% and generally at least 98 to 99% of hydrogen.

To this end, the invention has for its object a process of the recited type, characterized in that a portion of the residual gas is mixed with the impure gas to be treated, the rest of this residual gas constituting a purge.

According to other characteristics:
the production phase comprises a compression stage of the impure gas to the high pressure of the cycle, and said residual portion of the gas is mixed with the impure gas before the compression of this latter;
said residual portion of the gas is compressed before being mixed with the impure gas under the high pressure of the cycle;
the regeneration of the adsorber comprises the following stages:
  (a) a first cocurrent depressurization by balancing of pressure with another adsorber at the beginning of the pressure increase phase;
  (b) a second cocurrent depressurization, the gas emerging from the adsorber being sent to auxiliary storage;
  (c) a countercurrent depressurization to a low pressure of the cycle; and
  (d) countercurrent flushing with gas from the auxiliary storage, said residual portion of the gas originating from at least one of stages (c) and (d);
the increase in pressure is effected countercurrent, first by balancing of pressure with another adsorber in phase (a) then by countercurrent introduction of gas purified in the adsorber;
the purge represents several percent to several tens of percent of the residual gas;
the flow rate of the purge is varied during the cycle, particularly as a function of the concentration of impurities in the residual gas.

An installation adapted to practice such a process comprises several adsorbers, an assembly of conduits and valves adapted to practice in each adsorber a cycle comprising the following operating phases, which are timewise offset from one adsorber to another by a fraction 1/n of the duration of the cycle, in which n is the number of adsorbers: substantially isobaric production at high pressure of the cycle, this production phase comprising the admission of impure gas to be treated into the adsorber through a first so-called entry end, of the adsorber, with circulation of this gas in the adsorber and simultaneous withdrawal from the other end of the adsorber of purified gas, the direction of circulation in the adsorber during this production phase being called cocurrent and the reverse direction of circulation being called countercurrent; regeneration of the adsorber comprising a decompression of the adsorber to a low pressure of the cycle, this decompression comprising at least one stage in which a residual gas is withdrawn countercurrent of the adsorber; and pressure increase to the high pressure of the cycle, is characterized in that it comprises a purge conduit connected to the entry end of the adsorbers and to which is connected a recycle conduit connected to the supply conduit for impure gas to be treated.

Examples of embodiment of the invention will now be described with respect to the accompanying drawings, in which:

FIG. 2 is a diagram illustrating the operating cycle of this installation; and

FIGS. 3 and 4 are partial schematic views of two modifications of the installation.

Figure 1:
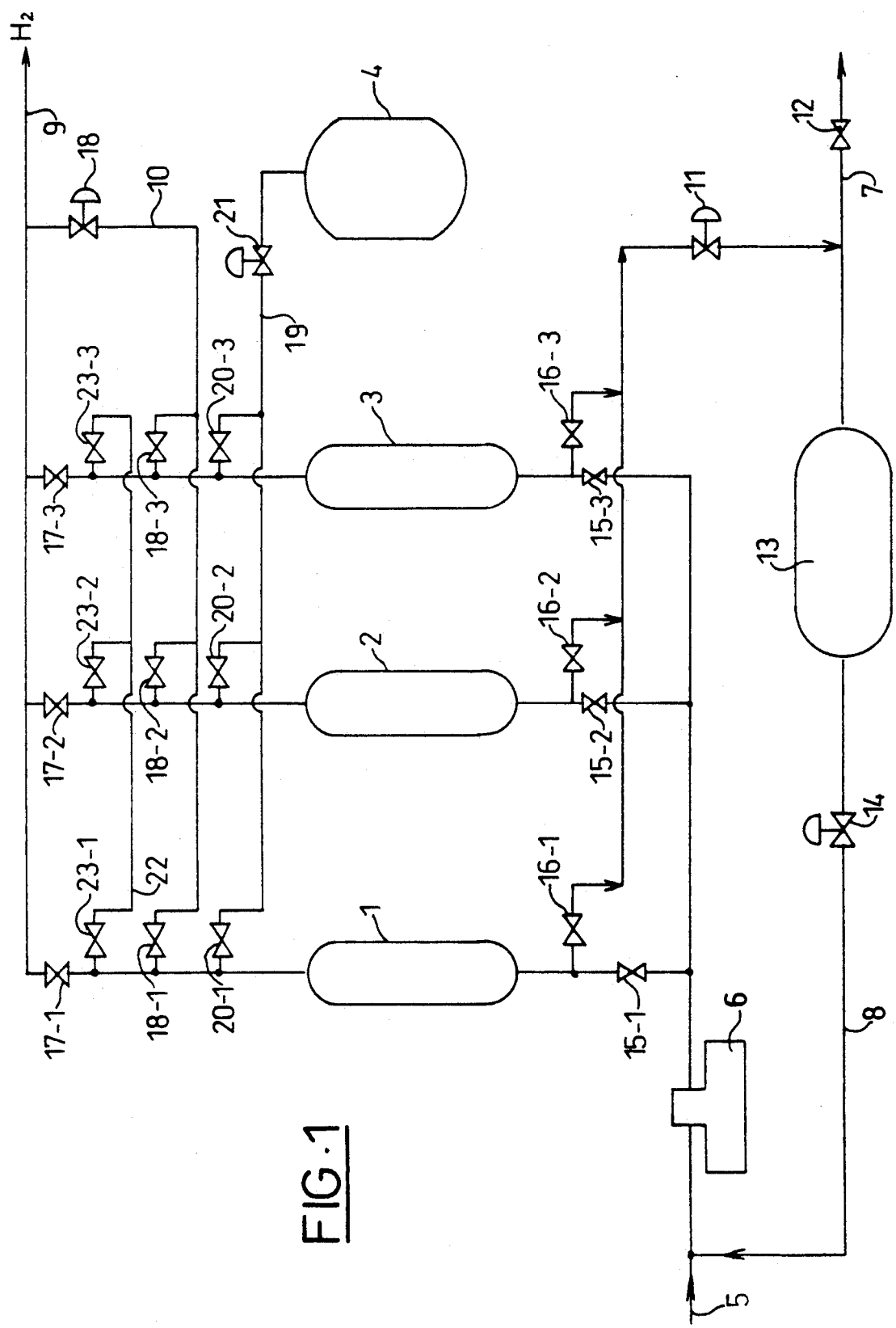
FIG. 1 shows schematically a hydrogen purification installation according to the invention.

The installation shown in FIG. 1 is adapted to produce practically pure hydrogen from an inlet mixture or "feed" constituted by impure hydrogen initially rich in hydrogen, which is to say containing typically at least about 90% and generally at least 98 to 99% of hydrogen. It comprises three adsorbers 1 to 3, an auxiliary storage 4, an inlet conduit 5 provided with a compressor 6, a purge conduit 7, a recycle conduit 8 connected to this conduit 7 and connected to the inlet conduit 5 and upstream of the compressor, a conduit 9 for the production of purified hydrogen, and a conduit 10 for drawing off purified hydrogen.

The purge conduit 7 comprises respectively upstream and downstream of the connection of the conduit 8, a flow control means 11 and a purge valve 12. The conduit 8 is provided, in a direction away from conduit 7, with a storage chamber 13, and then a flow control means 14.

The conduit 5 is connected to the inlet of each adsorber by means of a respective valve 15-1, 15-2, 15-3. Similarly, the conduit 7 is connected to the input of each adsorber by means of a respective valve 16-1, 16-2, 16-3.

The conduit 9 is connected to the outlet of each adsorber by means of a respective valve 17-1, 17-2, 17-3. Similarly, the conduit 10, provided with a flow control means 18, is connected to the outlet of each adsorber by means of a respective valve 18-1, 18-2, 18-3.

The storage 4 can be connected to the outlet of each adsorber by a conduit 19 provided with three valves 20-1, 20-2 and 20-3 respectively and a flow control means 21 located near the inlet of the storage.

Moreover, a balancing conduit 22 provided with respective valves 23-1, 23-2 and 23-3 permits connecting the outputs of the three adsorbers pairwise.

By means of this installation, which comprises known control and regulation means (not shown), there is provided for each adsorber a cycle shown in FIG. 2 with reference to adsorber 1. If T indicates the length of the cycle, the operation of the adsorber 2 is offset timewise by the time T/3 and that of the adsorber 3 is offset by the time 2T/3.

In FIG. 2, in which the times t appear on the abscissa and the absolute pressure P on the ordinate, the arrowed lines indicate the movements and destinations of the gaseous flows; when the arrows are parallel to the ordinate, they indicate also the direction of circulation in an adsorber: when the arrow is in the direction of increase of the ordinate (upward on the diagram), the flow is said to be cocurrent in the adsorber; if the upwardly directed arrow is located below the line indicating the pressure in the adsorber, the flow enters the adsorber at the inlet end of the adsorber; if the upwardly directed arrow is located above the line indicating the pressure, the flow leaves the adsorber by the outlet end of the adsorber, the inlet and outlet ends being respectively those of the gas to be treated and of the gas withdrawn during the isobaric production phase; when an arrow is directed toward the decreasing ordinate (downward in the diagram), the flow is said to be countercurrent in the adsorber. If the downwardly directed arrow is located below the line indicating the pressure of the adsorber, the flow leaves the adsorber by the entry end of the adsorber; if the downwardly directed arrow is located above the line indicating pressure, the flow enters the adsorber by the outlet end of the adsorber, the inlet and outlet ends being again those of the gas to be treated and of the gas withdrawn during the isobaric production phase. On the other hand, there are indicated in full lines the gaseous flows which relate exclusively to the adsorber 1 and in broken lines the gaseous flows from or to the other adsorbers.

Thus, for the adsorber 1, the cycle comprises the following phases:

From t=0 to T/3, the impure hydrogen to be treated arriving in conduit 5 is compressed by the compressor 6, is introduced under the high pressure PH of the cycle into the inlet of the adsorber, and an isobaric production of pure hydrogen is withdrawn under the same pressure from the outlet of the adsorber and removed through conduit 9.

From T/3 to t1<2T/3, the outlet of the adsorber is connected to that of another adsorber commencing its pressure increase phase. This stage continues until pressure equilibrium between the two adsorbers at an equilibrium pressure PE. As a variant, one could settle for a quasi-equilibrium.

From t1 to t2<2T/3, gas withdrawn from the outlet of the adsorber is sent to the auxiliary storage 4, which results in depressurization of the adsorber to an intermediate pressure PI.

From t2 to t3<2T/3, the adsorber is decompressed countercurrent, providing residual gas in the conduit 7. This stage continues until the low pressure of the cycle PB.

From t3 to 2T/3, the adsorber is countercurrently purged by flushing with gas withdrawn from the auxiliary storage 4, which again produces residual gas sent to the purge conduit 7.

In the course of these two latter stages described above, which is to say producing a countercurrent residual gas, a portion of the residual gas is recycled via conduit 8 and sent to the intake of compressor 6. The rest of the residual gas is evacuated from the installation as a purge, via the conduit 7 and the valve 12.

From 2T/3 to t4<T, the pressure of the adsorber rises again from PB to PE by balancing of the pressure with another adsorber in the course of the first cocurrent depressurization described above.

From t4 to T, the final stage of return to high pressure PH is effected by withdrawal of a portion of the product hydrogen via conduit 10.

Thanks to the recycling of a portion of the residual gas described above, there can be obtained a very high output of hydrogen, of the order of 95% as opposed to about 80% in the absence of such recycling.

Moreover, the recycling in question does not incur a large supplemental cost because, on the one hand, the recompression of the residual gas is effected by means of the feed compressor 6, and on the other hand the dimensioning of the adsorber and of the other components of the installation is but little modified.

In the case of FIG. 1, the feed flow arriving via the conduit 5 is taken to be constant, and the same is true of the flow rate of recycled residual gas, thanks to the presence of the storage chamber 13 and of the flow regulating means 14.

In certain cases, it is not necessary that the feed flow rate be constant, for example if this feed is available in large quantities, in particular from a gasometer. In this case, the storage 13 and the flow controlling means 14 can be eliminated, as shown in FIG. 3; the flow of recycled residual gas changes freely in the course of the cycle, and by regulating the compressor 6 to a constant flow rate, this latter is fed at a feed flow rate which, at any moment, is such that the sum of this flow rate and of the flow rate of the recycled residual gas is constant with time.

In a similar modification (FIG. 4), if the feed is available under high pressure PH, the residual recycled gas, emerging from the storage chamber 13, is compressed to the same pressure PH by a compressor 6A. In this modification, as shown, the flow rate controlling means 14 of FIG. 1 can be omitted.

It is to be noted that the purge flow rate can be constant with time, or variable, or even intermittent, for example limited to intervals of time at which the concentration in impurities of the residual gas is a maximum. One could also obtain optimum purge having regard for variations of concentrations of impurities in the residual gas.

The invention can be used for the purification of other gases containing selectively absorbable impurities, particularly for the purification of helium or neon.

What is claimed is:

1. In a process for the purification of a gas containing selectively adsorbable impurities, using several adsorbers with, for each adsorber, a cycle comprising the following operating phases which are offset from one adsorber to the next timewise by a fraction 1/n of the duration of the cycle in which n is the number of adsorbers, the cycle comprising substantially isobaric production at a high pressure of the cycle, said production comprising the admission of impure gas to be treated into an adsorber at a first end of the adsorber with circulation of this gas in the adsorber and simultaneous withdrawal from a second end of the adsorber of purified gas, the direction of flow in the adsorber from the first end to the second end being cocurrent and the opposite direction being countercurrent; regeneration of the adsorber comprising a decompression of the adsorber to a low pressure of the cycle, this decompression comprising at least one stage in which a residual gas is withdrawn countercurrent from the adsorber; and increasing the pressure to the high pressure of the cycle; the improvement comprising mixing a portion of said residual gas with the impure gas to be treated, and purging the rest of said residual gas.

2. Process according to claim 1, wherein the production phase comprises a compression stage of the impure gas to the high pressure of the cycle, and wherein said portion of the residual gas is mixed with the impure gas before the compression of the impure gas.

3. Process according to claim 1, wherein said portion of the residual gas is compressed before being mixed with the impure gas under the high pressure of the cycle.

4. Process according to claim 1, wherein the regeneration of the adsorber comprises the following stages:

(a) a first cocurrent depressurization by equalizing pressure with another adsorber at the beginning of the pressure increase phase;
(b) a second cocurrent depressurization, the gas emerging from the adsorber being sent to an auxiliary storage (4);
(c) countercurrent depressurization to a low pressure of the cycle; and
(d) countercurrent flushing by means of a gas withdrawn from said auxiliary storage, said portion of the residual gas being taken from at least one of said stages (c) and (d).

5. Process according to claim 4, wherein the pressure increase is effectuated countercurrent, first by equalizing pressure with another adsorber in phase (a), then by countercurrent introduction of the purified gas into the adsorber.

6. Process according to claim 1, wherein the purge is several percent to several tens of percent of the residual gas.

7. Process according to claim 1, wherein the flow rate of the purge is varied during the course of the cycle, as a function of the concentration of impurities of the residual gas.

* * * * *